(12) United States Patent
Wright

(10) Patent No.: US 11,628,952 B1
(45) Date of Patent: Apr. 18, 2023

(54) CONSTANT TORQUE UAV DEVICE, METHOD AND SYSTEM

(71) Applicant: Censys Technologies Corporation, Daytona Beach, FL (US)

(72) Inventor: Conrad Herold Wright, South Daytona, FL (US)

( * ) Notice: Subject to any disclaimer, the term of this patent is extended or adjusted under 35 U.S.C. 154(b) by 0 days.

(21) Appl. No.: 17/650,609

(22) Filed: Feb. 10, 2022

(51) Int. Cl.
*B64F 1/06* (2006.01)
*B64C 39/02* (2023.01)
*B64U 70/00* (2023.01)

(52) U.S. Cl.
CPC .............. *B64F 1/06* (2013.01); *B64C 39/024* (2013.01); *B64U 70/00* (2023.01)

(58) Field of Classification Search
CPC ............ B64F 1/06; B64U 70/00; B64U 70/70
USPC .......................................................... 244/63
See application file for complete search history.

(56) References Cited

U.S. PATENT DOCUMENTS

| | | | | |
|---|---|---|---|---|
| 1,960,264 | A * | 5/1934 | Heinkel ..................... | B64F 1/06 244/63 |
| 4,079,901 | A * | 3/1978 | Mayhew ................... | B64F 1/06 124/36 |
| 4,678,143 | A | 7/1987 | Griffin | |
| 7,165,745 | B2 | 1/2007 | Mcgeer et al. | |
| 7,210,654 | B1 * | 5/2007 | Cox ...................... | B64C 39/024 244/190 |
| 7,954,755 | B2 * | 6/2011 | Lipponen .................. | F41F 7/00 244/63 |
| 8,733,695 | B2 * | 5/2014 | Robinson .................. | B64F 1/06 244/63 |
| 9,783,322 | B2 * | 10/2017 | Tully ........................ | B64F 1/08 |
| 9,862,505 | B2 * | 1/2018 | Wallace .................... | B64F 1/06 |
| 9,969,504 | B1 * | 5/2018 | Davis ........................ | B64F 1/06 |
| 10,118,713 | B2 * | 11/2018 | Tully ........................ | B64F 1/08 |
| 10,370,120 | B1 * | 8/2019 | McGann ............... | B64C 39/024 |
| 10,370,121 | B1 * | 8/2019 | McGann .................. | B64F 1/06 |
| 2008/0093501 | A1 * | 4/2008 | Miller ................... | B64C 39/024 244/49 |
| 2008/0203220 | A1 * | 8/2008 | Hanzlick .................. | B64F 1/10 244/63 |

(Continued)

FOREIGN PATENT DOCUMENTS

CN 101081638 A 12/2007
CN 101081638 B 11/2010

(Continued)

*Primary Examiner* — Christopher P Ellis
(74) *Attorney, Agent, or Firm* — Lori Sandman, Esq.

(57) ABSTRACT

The disclosed invention comprises a spring-based launch device, and method of using the device within a system for launching an unmanned aerial vehicle (UAV) using constant torque springs to pull a carriage to accelerate a UAV to the necessary launch speed. A torque frame holds multiple constant torque springs attached to an adjustable power system, enabling a selectable number of springs to connect to a spool. The adjustable power system enables the launch speed of the UAV to vary based on its launch requirements. The spool is used to move a carriage at constant acceleration. The carriage holds the UAV and is pulled along rails until it hits a stop spring system, which stops the carriage, causing the aircraft to be launched off the carriage. Retensioning of the system occurs through a retraction mechanism which pulls the carriage back to a spring box, where it is positioned in tensioned configuration.

20 Claims, 10 Drawing Sheets

(56) References Cited

U.S. PATENT DOCUMENTS

2012/0012695 A1* 1/2012 Robinson ................. B64F 1/06
244/63

FOREIGN PATENT DOCUMENTS

| CN | 108082522 | A | * | 5/2018 | ............... B64F 1/06 |
| CN | 110395402 | A | * | 11/2019 | |
| CN | 112224434 | A | * | 1/2021 | |
| CN | 112393640 | A | * | 2/2021 | ............... B64F 1/06 |
| EP | 3007788 | A1 | | 4/2016 | |
| GB | 756056 | A | * | 5/2002 | |
| RU | 2497725 | C1 | | 11/2013 | |

* cited by examiner

CONSTANT TORQUE UAV DEVICE, METHOD AND SYSTEM

CROSS-REFERENCE TO RELATED APPLICATIONS

Not applicable.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

BACKGROUND OF THE INVENTION

The present invention relates to launching and propulsive devices and systems. More specifically, the invention disclosed herein includes a device, method, and system for an improved catapult for launching unmanned aerial vehicles (UAV's).

Traditionally, catapults use either pressurized air or fluid, electrical systems, or mechanical spring systems for generating the power necessary to launch a UAV. Pressurized air or fluid catapult systems such as a pneumatic or hydraulic systems utilize a pressurized hydraulic or pneumatic cylinder to accelerate a carriage along a track, or to pull a cable to accelerate a carriage along a track. The carriage holds a UAV which is released from the catapult at the end of the carriage's travel along the track. Electrical systems utilize an electric motor to pull a cable or roll a carriage supporting a UAV to accelerate it along a track. Mechanical spring systems typically utilize a linear or torsion spring to pull a cable or push a carriage along a track to launch a UAV.

Presently, use of UAV's is expanding to include flight over greater distances and more challenging or constrained initial launch space. Traditional pressurized, electrical, and mechanical systems alone are limited with respect to use with new UAV applications because of weight, energy or design considerations. Systems utilizing electrical motors require large power draws over a very short time, requiring complex and expensive capacitor systems or large power generators. Systems using non-electrical launch mechanisms are often very heavy, as the pneumatic, hydraulic, or spring based power systems are a significant part of its weight. The need for long springs, or large pressure cylinders means most launch system are difficult to compactly store and transport, and are unwieldy when fully assembled. Commercially available systems, with the exception of some electrical systems, can only provide a certain minimum and maximum amount of force along the launch rail, limiting the type of UAVs that can be launched on that platform. Electrical systems need wires, components and connections, making these systems bulky and difficult to transport and use in remote locations.

What is needed is an improved catapult system capable of launching UAV's that is compact, lightweight, transportable, simple and fast to set up, and does not need external electrical power to use. The invention disclosed herein provides such a system. In addition, due to the use of spiral constant torque springs, the overall size of the launch system can be reduced, enabling more compact storage, easier transport, and lower system weight. This invention further enables the use of springs that can be alternately connected and disconnected, allowing the force along the launch rail to be changed for each UAV launched. This invention further includes a modularity feature that provides the capacity to extend and expand launch functionality, providing for adjustable, mission-specific flexibility.

BRIEF SUMMARY OF THE INVENTION

The invention disclosed herein can be used to launch UAV's for space-efficient and controlled flight entry. UAV's in a variety of sizes and shapes can be launched from the device, and it is capable of considerable thrust despite a compact and moveable design. The system is modular, so it can be expanded to accommodate a variety of devices and mission types.

The present invention utilizes a power variance system that provides torque to one or more spools associated with and capable of pulling a rail-mounted carriage. The power variance system includes an adjustable power aspect, which functions with one or more cables associated with multiple spool assemblies engaged with a shared output spool; this output spool and cable or cables is connected with a carriage that transports the UAV for launch. The system includes support components including trusses and legs that stabilize and support a plurality of modular rail sections. These sections can be detachably connected with each other, and the system can thereby be expanded by adding additional rail sections; additional sections comprising rail components and support components including support legs and support trusses are attached via a latch system. A unique stop and release mechanism is disclosed herein. The stop spring system 65 of this invention is an advantage over the related art in that it is reusable; it remains intact and does not crush upon impact or launch. A retraction winch is mounted to the rearmost modular rail section, which functions in association with the power variance system to re-position the carriage and re-tension the system.

It is an object of this invention to provide a catapult system capable of launching UAV's that is compact, lightweight, portable and readily transported.

It is a further object of this invention to disclose a process for launching UAV's employing simple and rapid set up and actuation.

It is a different object of this invention to provide an improved UAV launching device and method that does not need external electrical power to use.

It is a separate object of the invention to provide a modular, extendable and expandable launch system that is capable of customizable track length to provide capacity for varying mission, launch and UAV specifications.

It is another object of this invention to provide a novel, adjustable power system incorporating constant torque springs and capable of variable UAV launch parameters including different UAV sizes and configurations, launch speed and distance requirements.

Other objects and advantages of the various embodiments of the present invention will become obvious to the reader, and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

REFERENCE CHARACTERS USED IN THE DRAWINGS

1. Power variance system
2. Stick shifting system
3. Shift stick
4. Shift stick knob
5. Locking trigger
6. Trigger spring
7. Locking bar
8. Locking bar cross pin
9. Locking recess
10. Locking recess retaining bolts
11. Shift slider
12. Slider retaining bolts
13. Shift fork
14. Fork retaining bolts
15. Shift retaining shaft
16. Shift shaft mounting bearings
17. Shift shaft key
18. Fork shaft
19. Fork shaft mounting bearings
20. Fork shaft key
21. Gearing system
22. Geared synchronicity sleeves
23. Output gear
24. Synchronicity sleeve shaft
25. Synchronicity sleeve shaft mounting bearings
26. Synchronicity sleeve shaft key
27. Output shaft
28. Output shaft mounting bearings
29. Output shaft key
30. Output spool
31. Cable retaining bolt
32. Torque frame
33. Spring plate
34. Apertures for mounting bearings
35. Top plate
36. Shift stick aperture
37. Top plate retaining bolts
38. Containment plates
39. Containment plate retaining bolts
40. Constant torque spring
41. Spring storage spool
42. Spring storage spool shaft
43. Spring power spool
44. Spring
45. Spring retaining bolts
46. Launch rail
47. Redirection pully
48. Pully mounting plates
49. Pully shaft
50. Top alignment pully
51. Bottom alignment pully
52. Modular rail section
53. Rail
54. Rail mounting bolts
55. Support truss
56. Latch system
57. Latch
58. Retaining catch
59. Front support leg
60. Front support leg holder
61. Front support leg locking aperture
62. Rear support leg
63. Rear support leg holder
64. Rear support leg locking aperture
65. Stop spring system
66. Buffer spring
67. Buffer pad
68. Spring mount
69. Spring mounting cup
70. Buffer pad retaining bolt
71. Cable
72. Retraction winch
73. Winch spool
74. Winch spool shaft
75. Manual retraction handle
76. Power retraction attachment point
77. Carriage
78. Launch arms
79. Launch arm retaining bolts
80. Wing clamps
81. Clamp pad
82. Carriage linear bearings
83. Linear bearing retaining bolt
84. Cable quick lock
85. Spool alignment frame

DETAILED DESCRIPTION OF THE INVENTION

Figure 1:
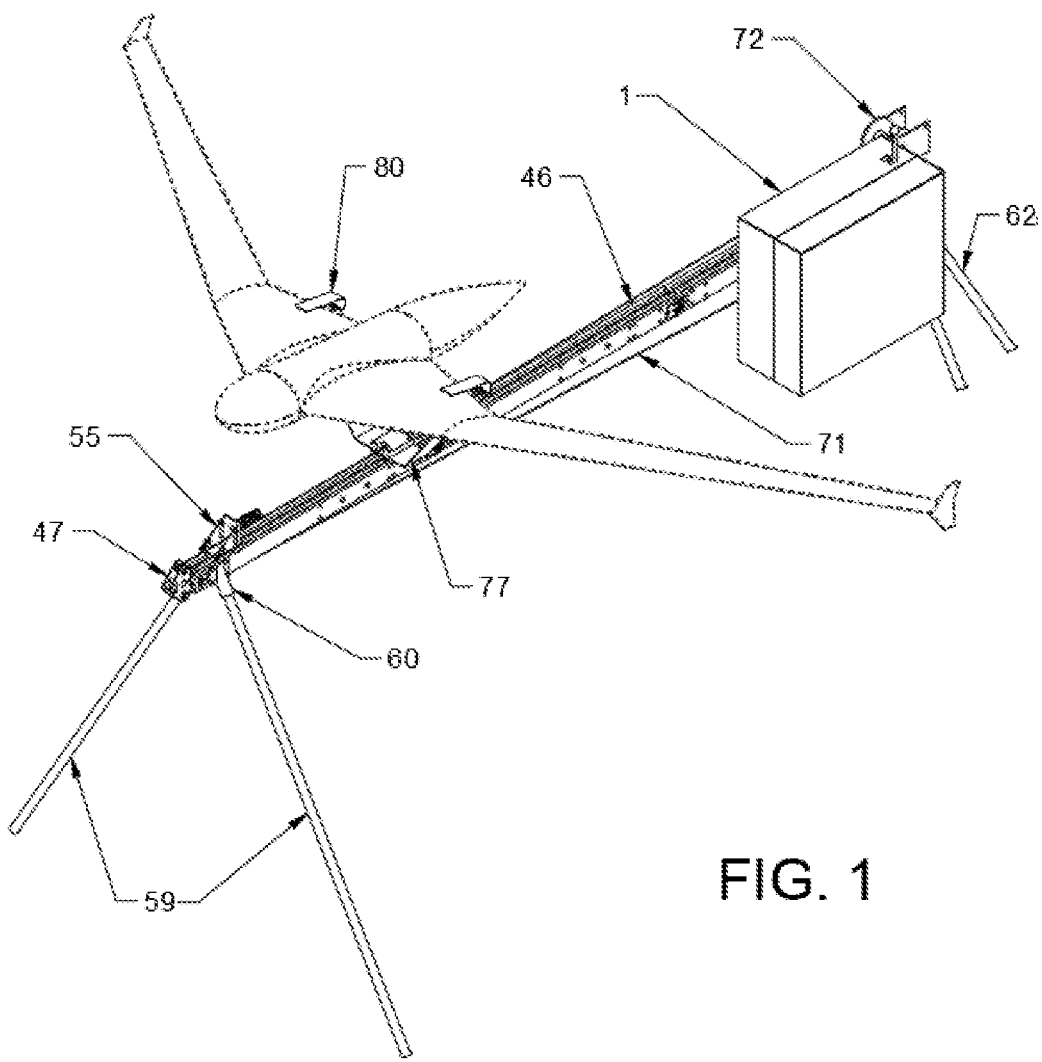
FIG. 1 is a perspective view of the device of the invention from a first side.

The disclosed invention is a mechanical, spring-based launch device, method, and system for launching an unmanned aerial vehicle (UAV) using one or more constant torque springs 40 to pull a carriage 77 to accelerate a UAV to the necessary launch speed. The system utilizes a torque frame 32 to hold the one or more constant torque springs 40 attached to an adjustable power system, enabling a selectable number of springs to connect with associated spools. By connecting or disconnecting springs and their associated spools, the adjustable power system enables adaptability to accommodate variations in UAV size, launch speed and related launch and mission requirements. The spools of the adjustable power system are connected and thereby engaged with the system to move a carriage 77 at constant acceleration. The carriage 77 holds a UAV and is pulled along a set of rails 53 until it hits a stop spring of the stop spring system 65, which stops the carriage 77, causing the UAV to be launched off the carriage 77 and into the air. Re-tensioning of the system occurs through a retraction mechanism which pulls the carriage 77 back to a spring box of the stop spring system 65, where it rests in charged, or re-tensioned configuration while the UAV is placed onto the carriage 77 for launch. This novel application of a constant torque spring can provide a consistent force during the acceleration of a UAV.

FIG. 1 illustrates a perspective view of a preferred embodiment of the invention. The dotted lines illustrate one embodiment of a UAV positioned for launch (a UAV is not part of the present invention). The overall system as shown in FIG. 1 comprises modular rail sections 52, which are detachable and supported by support components including trusses and legs. The system further comprises a power variance system 1 that provides energy to launch a UAV; the amount of energy provided is adjustable. In operation, the power variance system 1 provides torque to an output spool 30. The output spool 30 pulls a cable 71 that is redirected to the carriage 77 by a redirection pully 47. The carriage 77 is connected to the power variance system 1 by the cable 71, and runs on one or more rails 46 of a modular rail section 52 that is mounted on a support truss 55. Each modular rail section 52 has a front end and a back end, and can function separately from other modular rail sections 52, or may be continuously joined with other modular rail sections 52. Each section is supported by front support legs 59, attached at the front of the assembled device and end of the launch run, and rear support legs 62 that are attached at the back or rear of the modular rail section 52 or of the assembled device, meaning the beginning of the launch run. Each modular rail section 52 comprises support components including a support truss 55 and one or more rails 46, and each modular rail section 52 may be continuously joined with or connected to another modular rail section 52 at one or both ends using a latch system 56. In a preferred embodiment, the latch system incorporates a draw latch. On one end of the latch system, a lever connected to a loop is mounted. On the other end, a hooked plate is mounted. When the lever is actuated or pressed down toward the surface of the support truss 55, the loop locks into the hooked plate and draws the two ends tightly to each other using tension. To release the modular rail sections 52, the lever is pulled away from the support truss 55, removing the tension in the latch and allowing the two ends to come apart. One skilled in the art would appreciate that other latching or connecting mechanisms could be used to connect the modular rail sections 52 and still be consistent with and fall within this disclosure. A retraction winch 72 is removably mounted over the rear support legs 62 of the back of the rearmost modular rail section 52, or beginning of the launch run of the assembled device (most distal from the launch point). In the embodiment depicted in this figure, the power variance system 1 is positioned in front of the retraction winch 72 of the retraction system. The retraction system comprises the retraction winch 72 mounted to the rearmost modular rail section 52, which functions in association with the power variance system 1 and one or more output spools 30 associated with and capable of pulling, winding, unwinding and positioning one or more cables 71.

Figure 2:
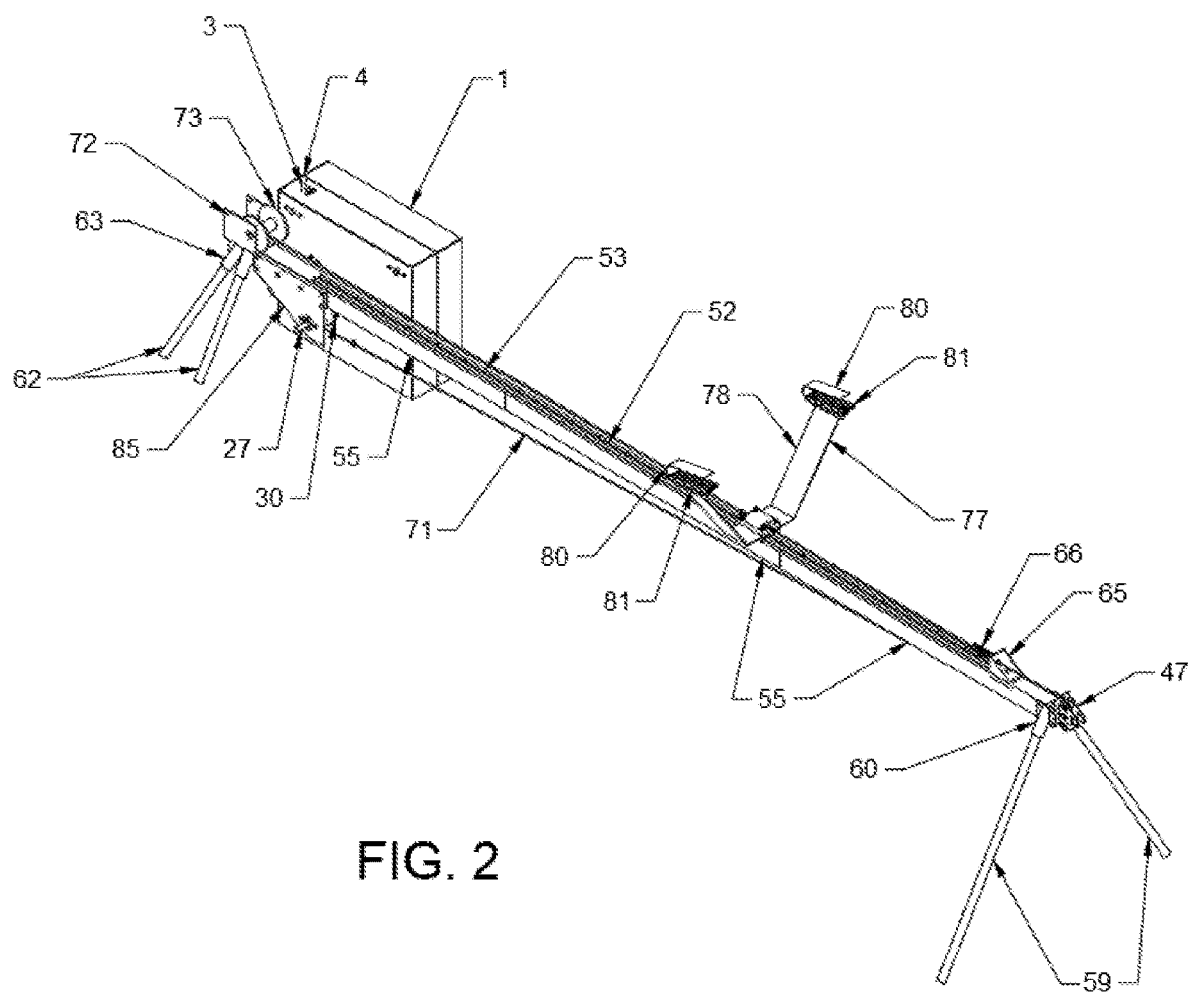
FIG. 2 illustrates a second perspective view of the embodiment of the invention in FIG. 1 from a second side.

FIG. 2 illustrates a second perspective view of the embodiment of the invention in FIG. 1 from a second side. This view shows the retraction winch 72 with its winch spool 73; the retraction winch 72 engages and winds back the cable 71 to re-tension the catapult. The retraction winch 72 is mounted on the support truss 55. In a preferred embodiment, the retraction winch 72 is positioned over the rear support leg holders 63; the rear support legs 62 are removably attached using the rear support leg holders 63, which are capable of engaging and supporting the support legs. The support leg holders 63 conform to, surround, support and connect the rear support legs 62. In one embodiment, the rear support legs 62 are threaded into the rear support leg holders 63 or directly into the truss 55. One skilled in the art would appreciate that various mechanisms could be used to support, engage and lock the support trusses 55 and the support legs 62 to the device, including but not limited to snaps, hinges, bolts, magnets or screws and still fall within this disclosure.

As illustrated in FIG. 2, the spool alignment frame 85 is positioned adjacent to and directly in front of the retraction winch 72 of the retraction system. The spool alignment frame 85 aligns the output shaft 27, which is fastened to the spool alignment frame 85 by an output shaft mounting bearing 28; the spring storage spool 41 and the spring power spool 43 are also aligned via the spool alignment frame 85. The power variance system 1 is positioned across the support truss 55 from and coplanar with the spool alignment frame 85, and provides torque to an output shaft 27, which rotates the output spool 30 to wind the cable 71 around it. The retraction system further comprises a winch and a winch spool 73 connected with a winch spool shaft 74, and whereby the retraction system is engaged by retracting a manual retraction handle 75.

In operation, the carriage 77 slides on one or more track or rail sections (hereinafter rail or rails, used to describe but not limit the number of one or more rails) that are positioned on and mounted to the top of one or more support trusses 55. Both the rails 53 and the support trusses 55 are split into sections forming a series of modular rail sections 52 that can be added or removed from the system as necessary to adjust the length of acceleration that the carriage 77 undergoes. In the frontmost rail section at the end of the launch run (the section containing the launch point, or the spot where the UAV is released from the rail) a stop spring system 65 is mounted on top of, or removeably connected with the support truss 55, and further comprises a buffer spring 66 and buffer pad 67 which work together to slow down the carriage 77 at the end of its travel. The stop spring system 65 of this invention is an advantage over the related art in that it is reusable; it remains intact and does not crush upon impact or launch. In front of the stop spring system 65 is the redirection pully 47, which guides the cable 71 around the end of a terminal or end support truss 55 and underneath the remaining support trusses 55. Front support leg holders 60 are positioned on either side of the redirection pully 47.

Figure 3:
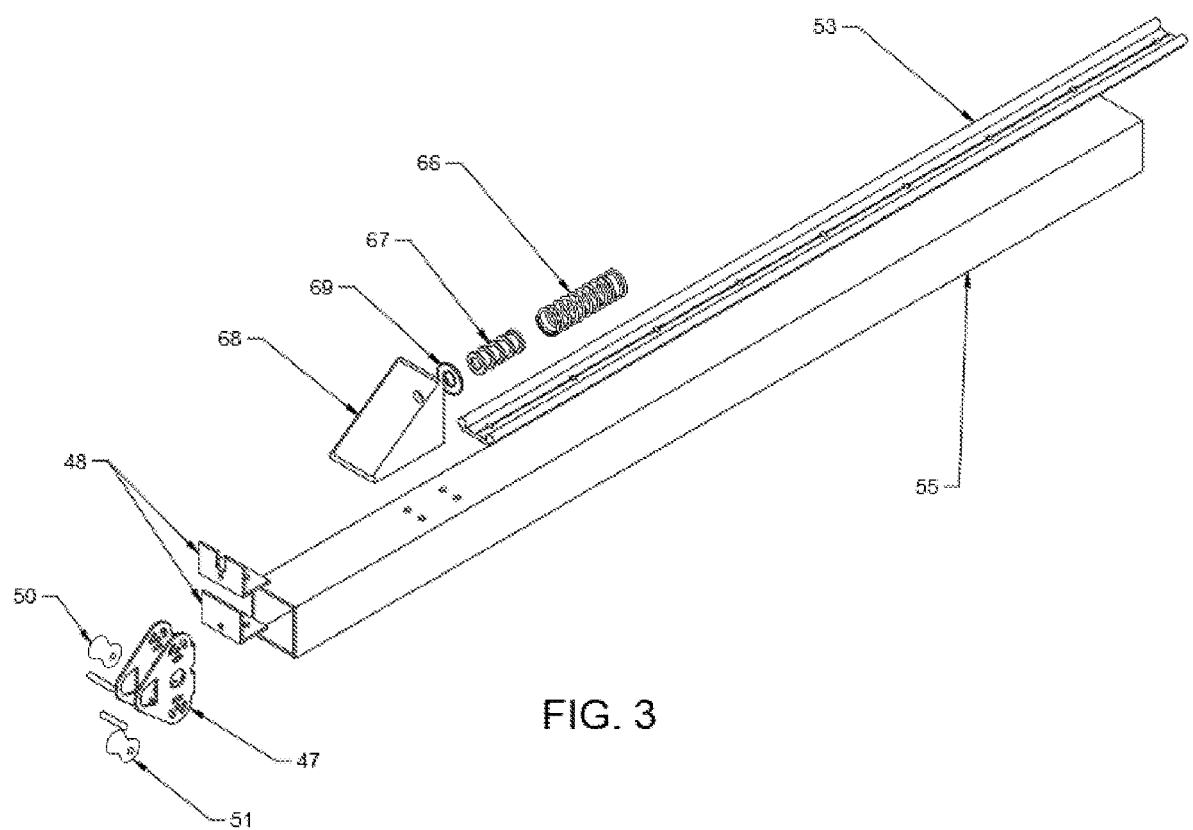
FIG. 3 is an exploded view of the launch carriage and associated parts.

FIG. 3 illustrates an exploded view of an end of the system, and its various component parts. The device's redirection pully 47 is illustrated with its components, further comprising the top alignment pully 50 which aligns the cable 71 with the aperture through the stop spring system 65 and the bottom alignment pully 51. The alignment pully 51 guides the cable 71 around the bottom of the support truss 55. The stop spring system 65 comprises a spring mount 68, which is fastened to the top of the support truss 55 and has the spring mounting cup 69 fastened to it. The buffer spring 66 is threaded into the spring mounting cup 69. A buffer pad 67 which absorbs the final impact of the carriage 77 is nested inside the buffer spring 66. The buffer spring 66 and the buffer pad 67 are suspended over the end of the launch rail 53 by the spring mount 68 such that the carriage 77 moves coplanar with the stop spring system 65.

Figure 4:
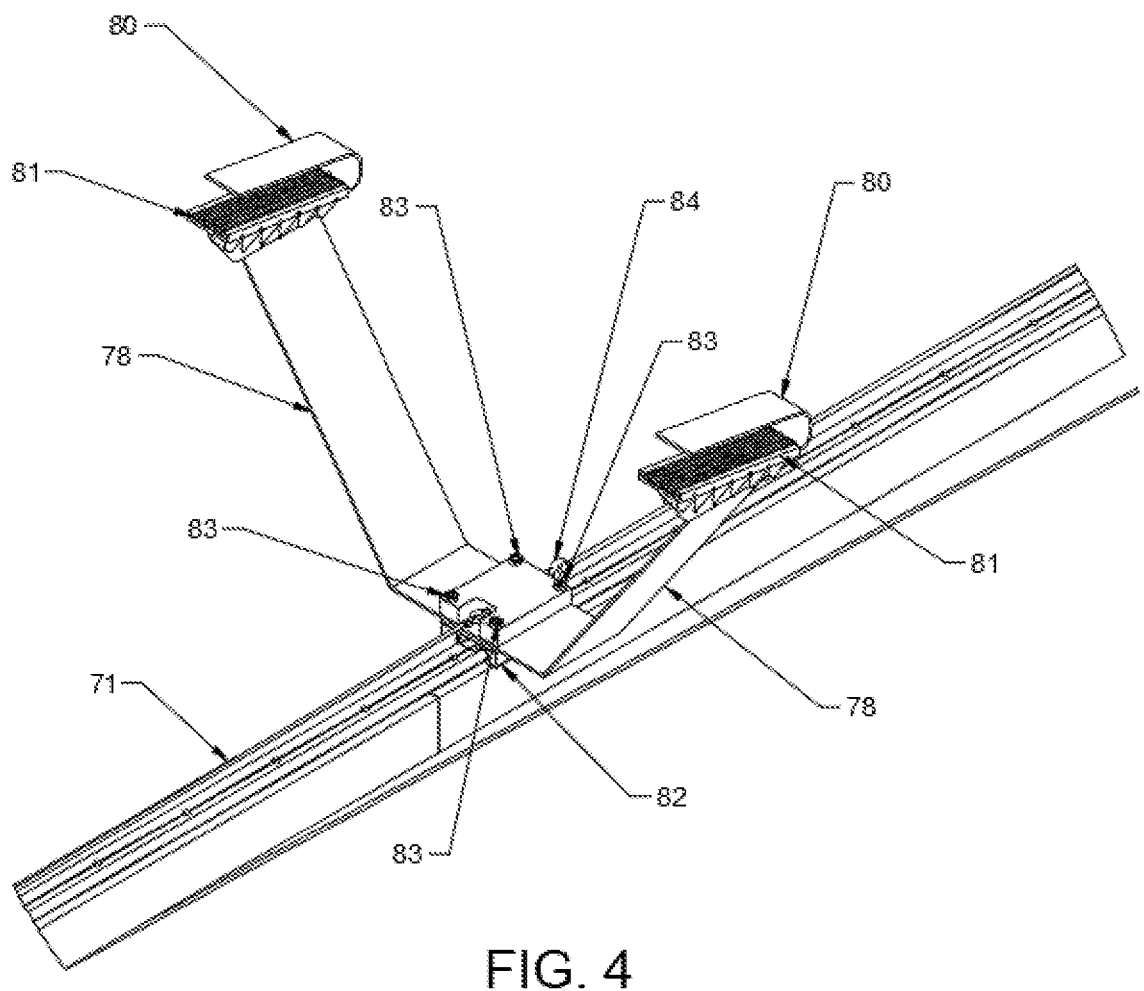
FIG. 4 is a perspective view of the device of the invention and shows a close-up view of the carriage system and related attachments.

FIG. 4 illustrates a perspective view of the device of the invention, and provides an exploded view detailing an embodiment of the carriage system and related attachments. The carriage 77 retains and supports the UAV to be launched, and transfers the motion of the cable 71 to the UAV. The carriage 77 is capable of movement, or sliding; it moves along the rails, and in a preferred embodiment the system incorporates carriage linear bearings 82, which are rolling element bearings that use ball bearings retrained in semi-circular cages to allow smooth motion along a rail 53.

The carriage linear bearings 82 are attached to the carriage 77 by a pattern of linear bearing retaining bolts 79. This pattern or configuration enables the carriage linear bearings 82 to be replaced when worn from repeated use. The linear bearing retaining bolts 83 attach to launch arms 78, which are spring-like structural components that extend upwards from the carriage 77 to maintain the position of the UAV free of any obstructions. The linear bearing retaining bolts 83 cushion the motion of the carriage 77 to decrease stress on the UAV. The launch arms 78 are removably attached to the UAV using wing clamps 80 covered in clamp pads 81; the clamp pads 81 are custom pads produced for the specific UAV being launched. The launch arms 78 comprise a first end and a second end; one end is removably attached to the carriage 77, and the second end is capable of removable connection with a UAV using wing clamps 80 conforming to and detachably connected with the wings of the UAV.

In a preferred embodiment, the wing clamp pads 81 are reinforced with metal or other similar hard, durable material, and structurally conform to the wing clamps 80 to provide an interface and support between the UAV and the wing clamps 80. The cable 71 is releasably connected to the carriage 77 using cable quick locks 84, which are locking mechanisms that allow the cable 71 to be quickly removed for attachment or when needed for replacement or repair.

An important feature of the present invention is that it can be customized for use with a variety of mission types and vehicle-specific flights. In addition to the customizable track length afforded by the modular nature of the system, the invention can be customized for a particular UAV by using the process of additive addition to manufacture the carriage components. Using additive addition process, the carriage 77 can be built to the specifications of a wide range of UAV size, weight, and related dimensional characteristics. The wing clamps 80, clamp pads 81 and even launch arms 78 can be custom manufactured by three-dimensional printing or related additive manufacturing technology, allowing for precise conformity with the specified UAV dimensions. The wing clamps 80 and clamp pads 81 matingly conform to the UAV; therefore, the present invention offers the advantage of a tight, precise and customized interface between the UAV and the invention.

Figure 5:
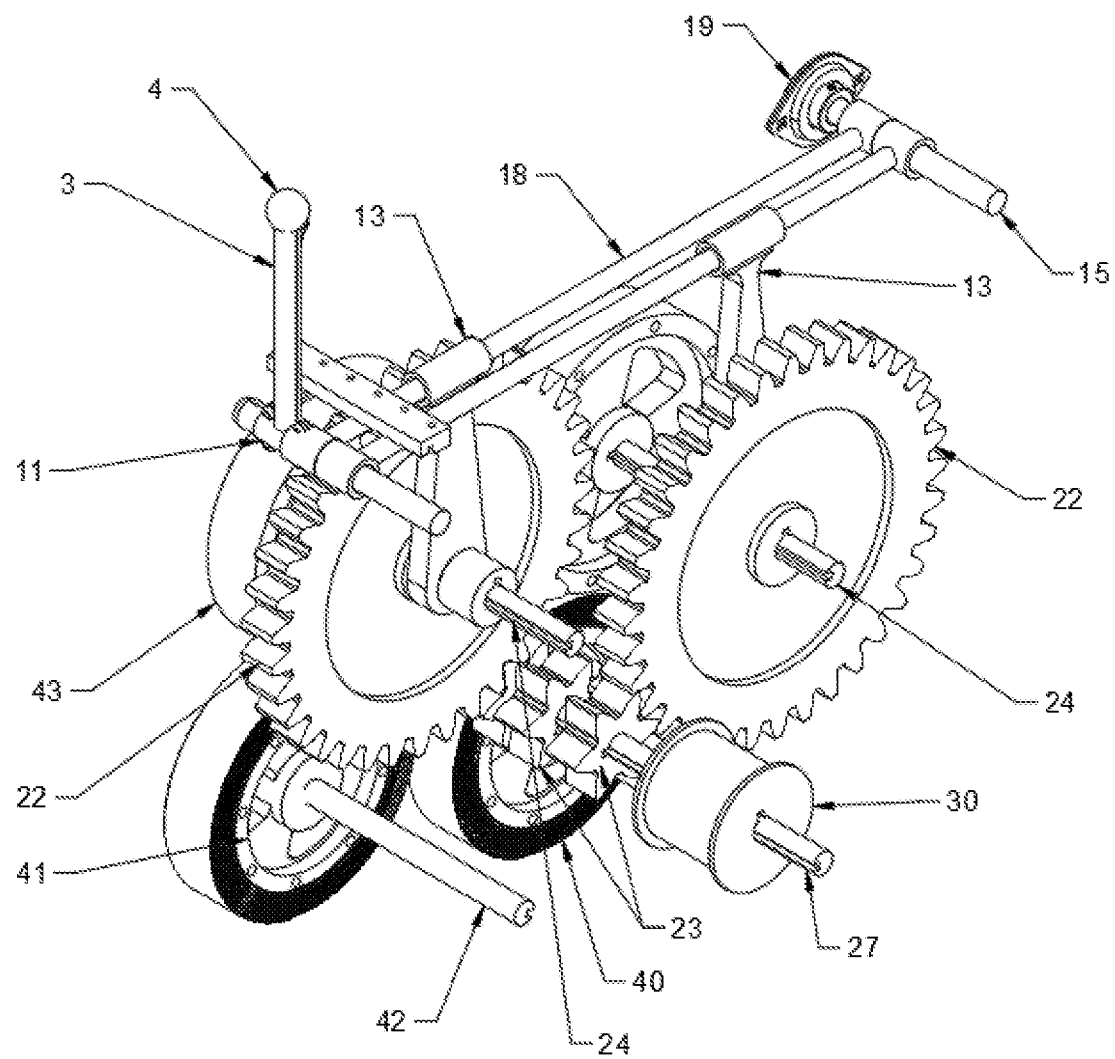
FIG. 5 is a perspective view of an embodiment of the device comprising two (2) spool assemblies and related gears.

FIG. 5 illustrates a perspective view of a two-spring embodiment of the power variance system 1. The power variance system 1 is a modular system that is built to integrate a plurality of springs or spring sets, which are accommodated by various spring configurations. In a preferred embodiment, a pair or set of two springs is used; however, the system has been designed to accommodate a plurality of springs to address various launch parameters. The power variance system 1 enables the transfer of torque from the constant torque springs 40 to the output spool 30, as the constant torque springs 40 are capable of being reversibly wound around the power spool 43 and storage spool 41, and the system is geared to increase the rate of rotation of the output spool 30 relative to the motion of the spring power spool 43. To facilitate this, the constant torque spring 40 is initially wrapped around the spring storage spool 41. The spring storage spool 41 holds the constant torque spring 40, except for a tail of the spring, which is fastened to the spring power spool 43 when the system is not under tension. When the system is tensioned, the constant torque spring 40 wraps around the spring power spool 43; this spool exerts a constant torque on the system when rotating. The spring power spool 43 is attached on a synchronicity sleeve shaft 24 by a synchronicity sleeve shaft key 26 that slots into a cut in the synchronicity sleeve shaft 24 and spring power spool 43 to lock the two parts together; this is illustrated further in FIG. 6. The geared synchronicity sleeve 22 is also attached to the synchronicity sleeve shaft 24 by a synchronicity sleeve shaft key 26. The geared synchronicity sleeve 22 is a single component combining the function of a spur gear and linear motion sleeve, which moves along the synchronicity sleeve shaft 24 to alternatively connect and disconnect with output gears 23 as it moves along the synchronicity sleeve shaft 24. When connected to an output gear 23, the geared synchronicity sleeve 22 transfers torque to the output shaft 27 to rotate the output spool 30. The output gear 23 is attached to the output shaft 27 using an output shaft key 29. The output spool 30, which is wrapped in the cable 71, rotates at a constant torque to pull the cable 71 at a constant acceleration back onto the output spool 30 while the UAV is being launched. To adjust the amount of torque being output by the power variance system 1 the operator uses a stick shifting system 2 to manually adjust the location of the geared synchronicity sleeves 22 on their synchronicity sleeve shafts 24 to connect with different output gears 23 as needed. A locking trigger 5 on the shift stick 3 is depressed to unlock a locking bar 7 from a locking recess 9 on the top plate 35 of the power variance system 1. The shift stick 3 is then moved to a different location in the shift stick aperture 36 and the locking trigger 5 is released when it is pushed by the trigger spring 6, which moves the locking bar 7 back into the locking recess 9. The shift stick 3 slides along the shift retaining shaft 15, and moves to the location of the fork shaft 18 that it is connected to. The fork shafts 18 have shift forks 13 on them such that the shift forks 13 are attached to the geared synchronicity sleeves 22, one shift fork 13 to each geared synchronicity sleeve 22. When the shift stick 3 moves to a different position in the shift stick aperture 36, these shift forks 13 pull the geared synchronicity sleeves 22 along the synchronicity sleeve shaft 24 so that the geared synchronicity sleeve 22 moves in contact with another output gear 23 along the output shaft 27. The synchronicity sleeve shaft 24 is rotatable, and the geared synchronicity sleeve shaft 24 of the power variance system alternatively connects and disconnects output gears 23 as it moves along the synchronicity sleeve shaft 24. This allows for modifying, or varying which constant torque springs 40 are engaged, and therefore how much torque is being used by the power variance system 1 can be varied.

Figure 6:
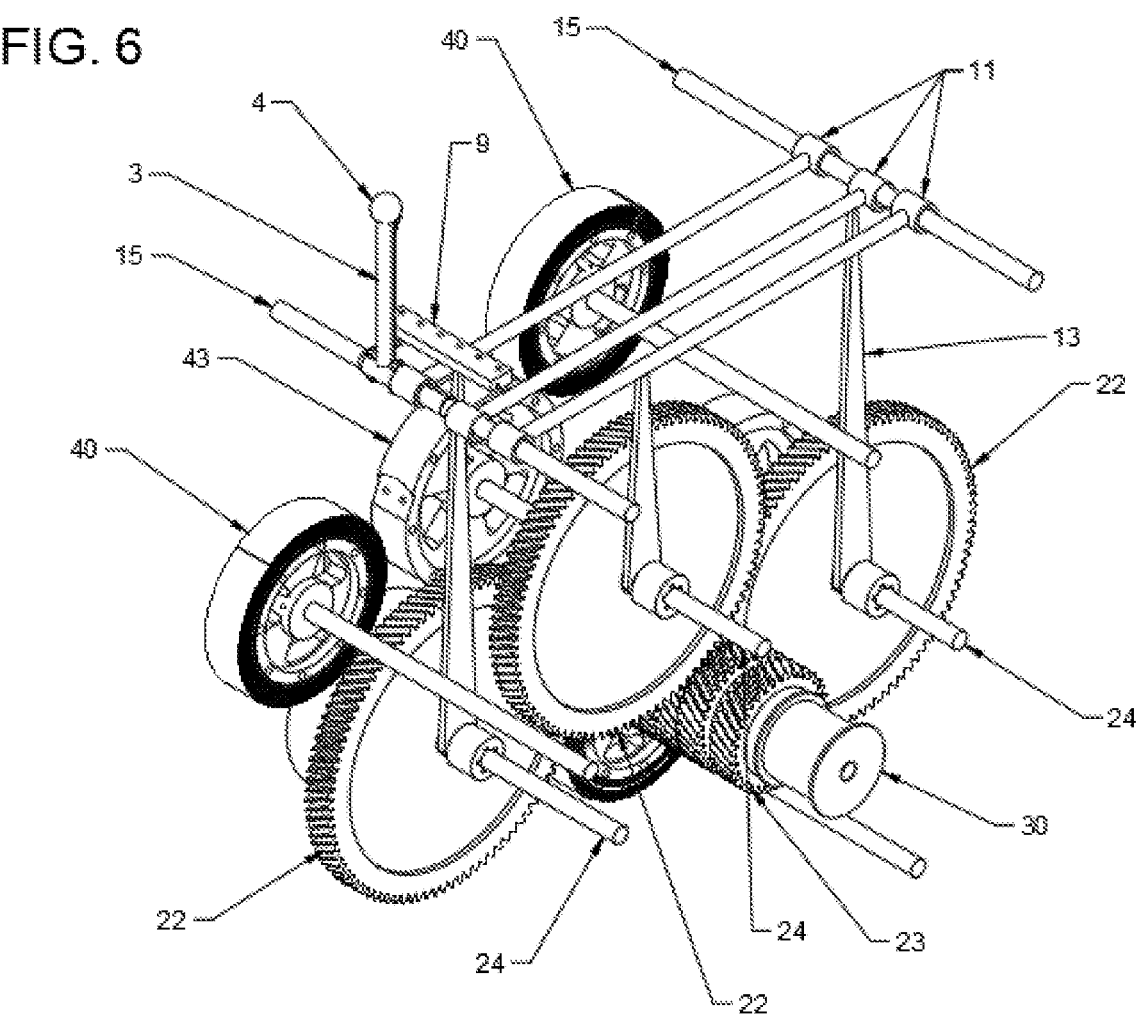
FIG. 6 illustrates an alternate embodiment of the device including three (3) spool assemblies and helical gears.

FIG. 6 illustrates an alternate embodiment of the system shown in FIG. 5. In FIG. 6, an additional spool assembly, including springs, spools and related gears, is included. Adding spool assemblies provides for additional force for UAV launch. Also, this figure demonstrates the system using helical gears. The power variance system 1 can be constructed with various gear types and characteristics, as long as the mechanism of torque transmission as described herein is maintained. FIG. 6 demonstrates the modularity of the system with respect to adding force for larger or heavier loads, or launch at faster speeds, and providing capacity to handle additional constant torque springs 40 by the addition of additional geared synchronicity sleeves 22 that are connected to the output gears 23 to transfer the torque to the spool 30. The connection and disconnection of the additional constant torque spring 40 is accomplished by the addition of a shift slider 11 connected to an additional shift fork 13. The locking recess 9 is also extended, allowing for a third position to lock into with the locking bar 7 that is in the shift stick 3. This allows the operator to select between engagement of one, two, or three of the constant torque springs 40 to transfer torque to the output spool 30 by causing different number of the geared synchronicity sleeves 22 to be connected to the output gears 23.

Figure 7:
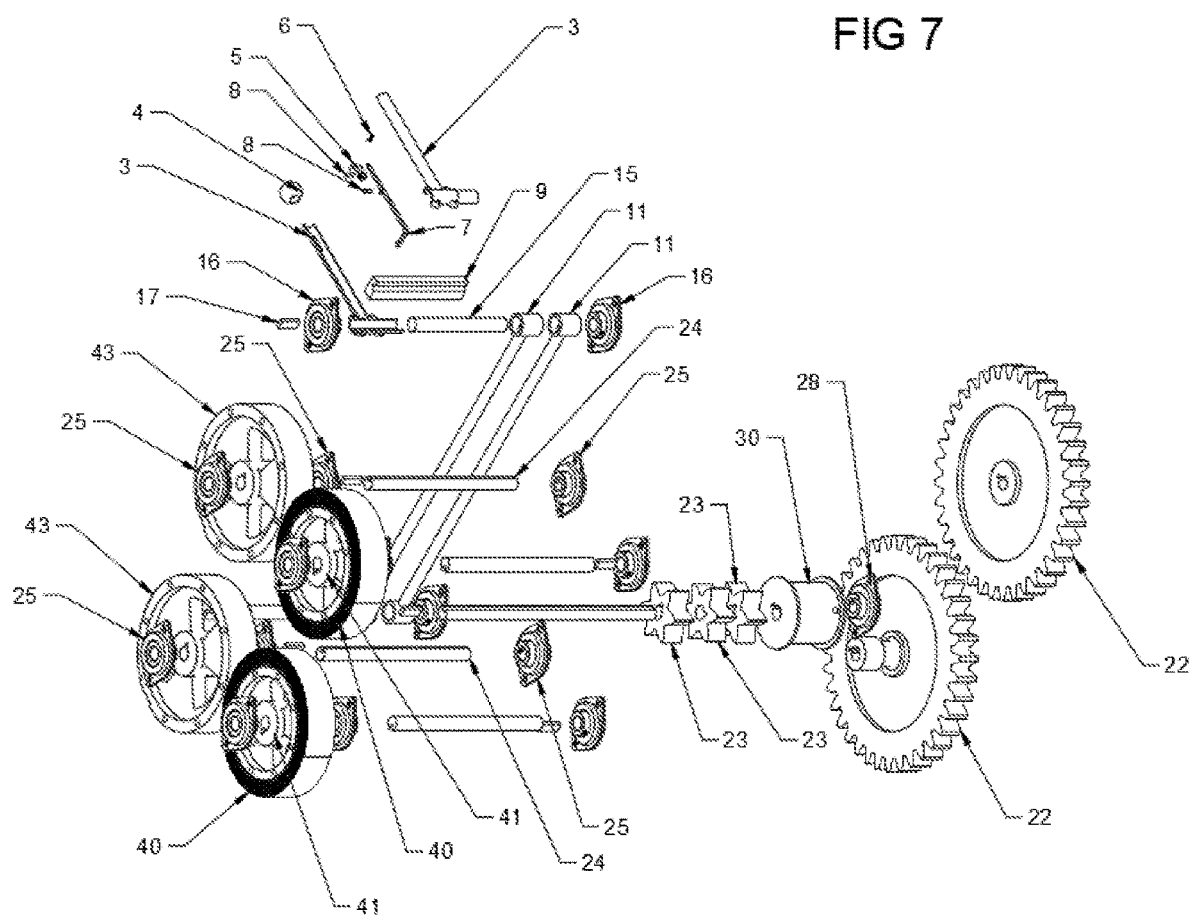
FIG. 7 is an exploded view of the embodiment shown in FIG. 5, illustrating the various components of the device's subsystems and their relative positions in the embodiment presented.

FIG. 7 illustrates an exploded view of the embodiment shown in FIG. 5, showing the various components of the device's subsystems. The stick shifting system 2 components are shown at the top of the figure. The shift stick 3 is shown split into its two halves, exposing the locking trigger 5, which allows the operator to release the locking mechanism retaining the shift stick 3 in its position during operation. The locking trigger 5 is formed such that it has a cup retaining the trigger spring 6 which provides positive pressure to hold the trigger in its resting state. The locking trigger 5 when pressed pulls the top of the locking bar 7 forward, tilting the locking bar 7 around its locking bar cross pin 8, which unlocks the locking bar 7 from locking recess 9, allowing the shift stick 3 to move. The shift stick 3 then slides along shift retaining shaft 15 and is connected to the shift retaining shaft 15 using the shift shaft key 17 which locks into the recesses on both the shift retaining shaft 15 and the shift stick 3. The shift retaining shaft 15 is held in place and allowed to rotate by the shift shaft mounting bearings 16.

Figure 8:
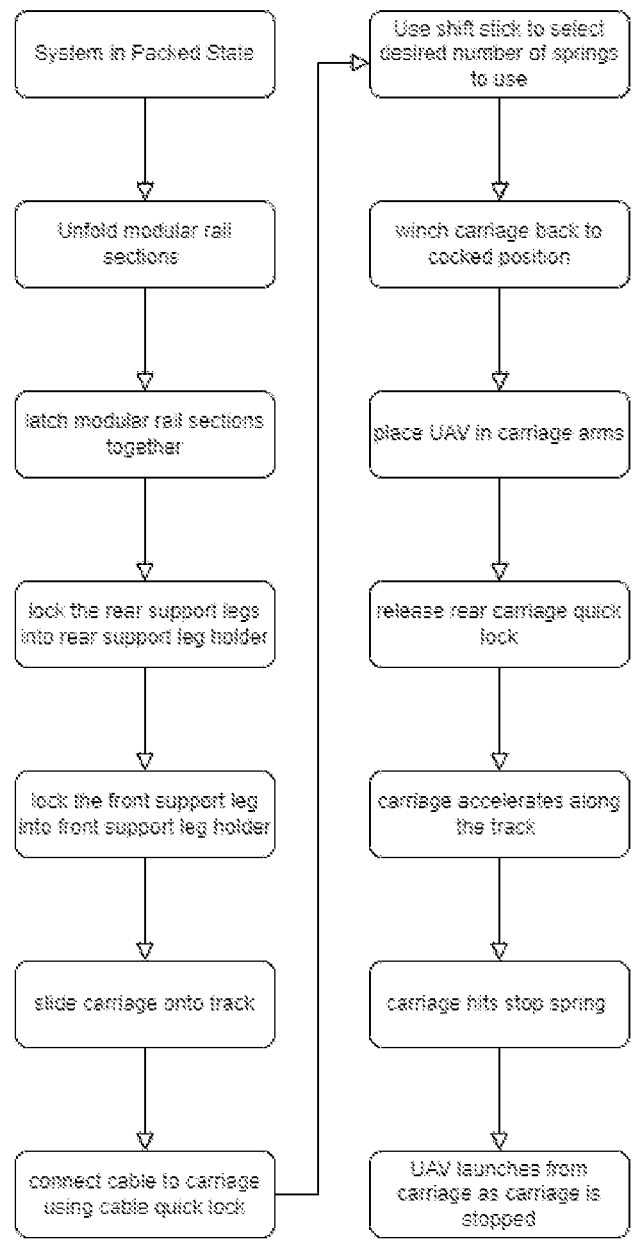
FIG. 8 is a flow diagram showing the steps incorporated in the method of use.

FIG. 8 illustrates the operational flow of the catapult system. The operator initially delivers the invention to the launch site in its packed state with the modular rail sections 52 folded, the cable 71 wound onto the retraction winch 72, and the front support legs 59, rear support legs 62, and the carriage 77 removed. The operator unfolds the modular rail sections 52 and latches them into place using the latch system 56, thereby positioning and joining the modular rail sections 52. Rear support legs 62 and front support legs 59 are attached through rear support leg locking apertures 64 and front support leg locking apertures 61 of the connected sections respectively; rear support legs 62 and front support legs 59 may be added as needed along the support truss 55 to support any additional modular rail sections 52 that are added to extend the run. The carriage 77 is then slid or mounted upon rails 53 mounted on the support truss 55 of one or more of the assembled modular rail sections 52. The cable 71 is then unwound from the retraction winch 72 and connected to the carriage 77 using the cable quick lock 84. The other end of the cable 71 is then unwound from the output spool 30 and positioned over the bottom alignment pully 51 and top alignment pully 50 before being threaded through the stop spring system 65 and attached to the carriage 77 using the cable quick lock 84. Pressing on the locking trigger 5 then unlocks the shift stick 3, allowing the operator to move the shift stick 3 into the position that connects the designated number of constant torque springs 40 to the output spool 30. Once the shift stick 3 is locked in place, the operator then uses the retraction winch 72 to draw the carriage 77 back to the base of the rail 53 where it then rests in the re-tensioned position. The operator then places a UAV within the wing clamps 80 located on the launch arms 78 of the carriage 77; these wing clamps 80 conform to, grasp and support the wings or other appendages of a UAV to keep it in place upon the device as it travels along the rails 53 prior to release at launch. The operator releases the cable quick lock 84 between the carriage 77 and the cable 71 wound around the retraction winch 72 in order to initiate launch. The carriage 77 is pulled by the cable 71 along the rail 53 as the output spool 30 rotates at a constant torque as provided by the power variance system 1, which causes the carriage 77 to smoothly accelerate. The carriage 77 then hits the buffer spring 66 of the stop spring system 65 which causes the UAV to be launched from the carriage 77. The carriage 77 slows before hitting the buffer pad 67 which further slows the carriage 77 and ultimately brings it to a stop at the end of the rail 53.

Figure 9:
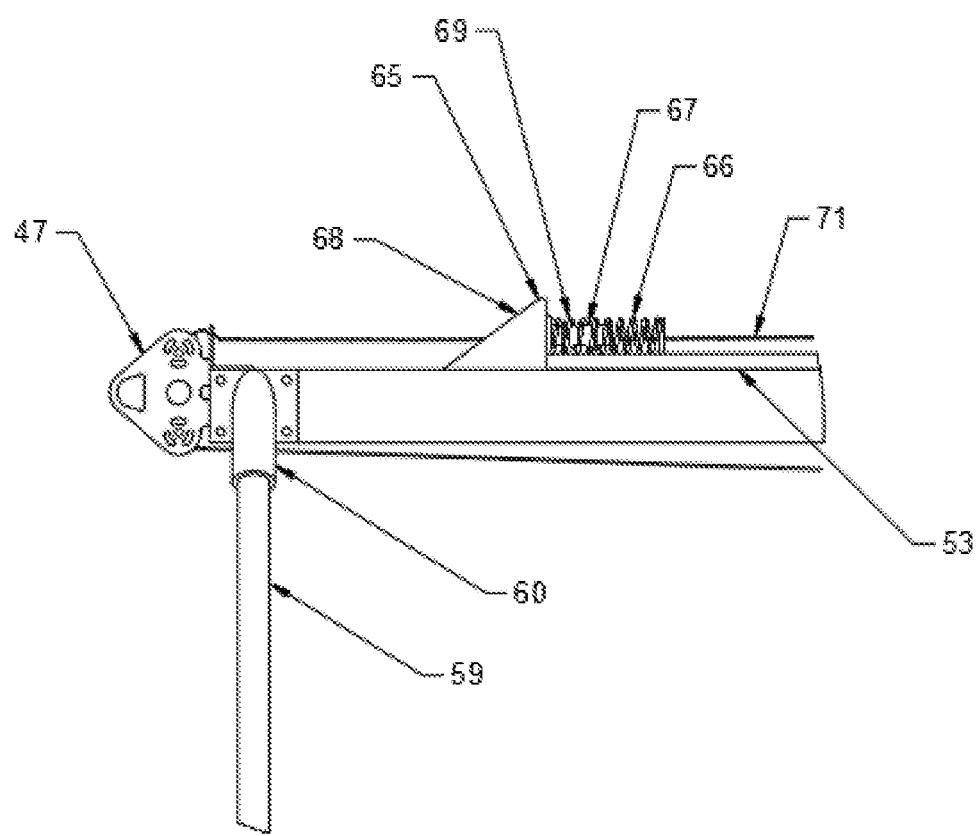
FIG. 9 is a side view of the front end of the catapult, showing the stop spring system, the redirection pully, and the front support legs.

FIG. 9 illustrates a side view of the device, including the stop spring system 65 and redirection pully 47. This figure presents a close up view of the front end of the catapult, showing the stop spring system 65, the redirection pully 47, and the front support legs 59. The stop spring system 65 comprises the spring mount 68 which is fastened to the modular rail section 52, and the buffer spring 66 and buffer pad 67 which are retained to the spring mount 68 using the spring mounting cup 69. The stop spring system 65 uses the two staged deceleration of the buffer spring 66 which initially slows the carriage 77 on impact, before being completely stopped by the buffer pad 67. This two-stage deceleration allows the stop spring system 65 to be fully reusable, as both the buffer spring 66 and buffer pad 67 are not crushed during operation. Also shown in the drawing is the front support leg holder 60 which is fastened to the modular rail section 52 and has the front support leg 59 screwed in the front support leg holder 60.

Figure 10:
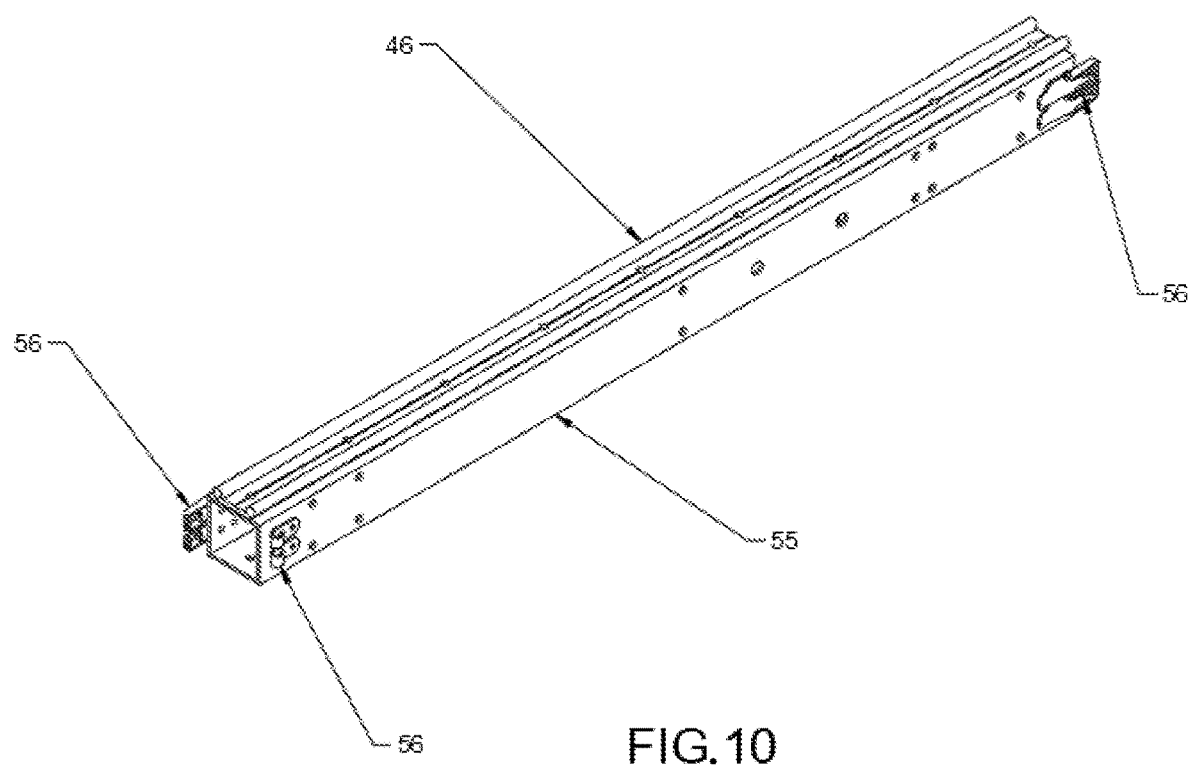
FIG. 10 is a perspective view of an embodiment of the modular rail system and further illustrating the rail, support truss, and latch systems.

FIG. 10 illustrates the modular rail section 52. It depicts the latch system 56 which secures each modular rail section 52 together to create a longer overall launch rail 46 to allow the carriage 77 to accelerate. The support truss 55 is shown, upon which the latch system 56 and the launch rail 46 are fastened. The support truss 55 contains a plurality of apertures that allow various components of the catapult to be attached, enabling a modular rail section 52 to be built into any section of the catapult, either a central section, a rear section with mounted rear support leg holders 63 and rear support legs 62 along with the power variance system 1 and retraction winch 72, or the modular rail section 52 can be added onto a front section with the attachment of a redirection pully 47, front support leg holders 60 and front support legs 59, as well as a stop spring system 65.

I claim:
1. A UAV launch device comprising:
   A. One or more modular rail sections that function separately or may be continuously joined with other modular rail sections; said modular rail sections further comprise: a front end and a back end; one or more detachably connected support components, including a support truss and one or more support legs; and one or more launch rails detachably connected to the one or more detachably connected support components; and a latch system capable of continuously joining one or more modular rail sections with other modular rail sections;

B. a power variance system with an adjustable power aspect including one or more spool assemblies that can be engaged and disengaged with an output spool by connecting it with one or more cables releasably connected to said output spool;

C. a retraction system further comprising: a retraction winch mounted to the rearmost modular rail section, which functions in association with the power variance system; and one or more output spools associated with and capable of pulling, winding, unwinding and positioning one or more cables;

D. One or more cables, each with a first end and a second end, wherein the one or more cables are releasably attached at the first end to the retraction winch and the second end is releasably attached to a rail-mounted carriage; and wherein the first end of the one or more cables is releasably attached to said rail mounted carriage and the second end is releasably attached to an output spool;

E. a rail-mounted carriage connected to the retraction system by the cable;

F. A reusable stop spring system releasably connected with the frontmost rail section; and G. A torque frame releasably connected with one or more constant torque springs.

2. The device of claim 1 wherein the detachably connected support components include one or more front support legs attached at the front end of the assembled device or at the front end of individual modular rail sections, and rear support legs that are attached at a back end of the assembled device or the back end of a modular rail section, and wherein additional front support legs and back support legs can be added to individual modular rail sections to support continuously joined modular rail sections; and wherein the front support legs and the back support legs are connected to the modular rail sections by support leg holders capable of engaging and supporting the support legs.

3. The device of claim 1 wherein the latch system further comprises a draw latch, wherein one end of the latch further comprises a mounted loop that is releasably connected with a second end of the latch, said second end of the latch further comprises a hooked plate, and wherein the latch system is actuated by a lever that connects the loop and locks it into the hooked plate.

4. The device of claim 1 wherein the carriage further comprises a front end and a back end and removeably attached components including launch arms, wing clamps, and clamp pads; the removeably attached components are located upon the carriage between the front end and the back end, and wherein the carriage moves on the rail section upon linear bearings; and wherein the carriage is releasably attached at the front end and the back end to the cable.

5. The device of claim 1 wherein the retraction system further comprises a winch and a winch spool connected with a winch spool shaft, and whereby the retraction system is engaged by retracting a manual retraction handle.

6. The device of claim 1 wherein the one or more constant torque springs are connected and disconnected by a shift slider connected to a shift fork, allowing the shift fork to be positioned and locked onto a locking bar with a shift stick and actuated by a locking trigger such that the number of constant torque springs engaged can be varied.

7. The device of claim 1 wherein the one or more spool assemblies comprise a plurality of spools, and the spools of the spool assembly include a spring storage spool, and an output spool, and wherein the spring storage spool and the spring power spool are aligned via a spool alignment frame that is positioned adjacent to and directly in front of the retraction system, and coplanar with the power variance system; the alignment frame additionally positions and allows for the application of torque to an output shaft that rotates the output spool.

8. The device of claim 1 wherein the stop spring system further comprises a buffer spring, a buffer pad, one or more spring mounts fastened to the top of a support truss, and a redirection pully; and wherein the stop spring system facilitates the release and launch of the UAV from the carriage using a two staged deceleration of the buffer spring which initially slows the carriage on impact with the buffer spring and is completely stopped by the buffer pad, allowing the stop spring system to be fully reusable.

9. The device of claim 1 wherein one or more cables are directed by the redirection pully around the end of one of the one or more support trusses and underneath any additional support trusses, and the cable is aligned by an alignment pully that positions the cable or cables through an alignment aperture and connects it with the carriage.

10. The device of claim 1 wherein the launch arms comprise a first end and a second end, wherein one end is removably attached to the carriage, and the second end is capable of removable connection with a UAV using wing clamps conforming to and detachably connected with the wings of the UAV and wherein the wing clamps further comprise clamp pads that conform to said wing clamps and provide an interface between the UAV and wing clamps.

11. The device of claim 1 wherein one or more of the launch arms, the wing clamps, and the wing pads of the carriage are made by a process of additive manufacture to provide for customization.

12. The device of claim 1 wherein the one or more spool assemblies comprises a power spool, a storage spool and one or more constant torque springs capable of being reversibly wound around said power spool and storage spool.

13. The device of claim 12 wherein the number of spool assemblies is two.

14. The device of claim 12 wherein the power spool and the storage spool in the one or more spool assemblies are releasably connected with each other via engagement with the one or more constant torque springs, and the output spool is releasably connected to the power spool, the storage spool and the constant torque spring with the cable.

15. The device of claim 1 wherein the power variance system is modular, and further comprises a plurality of spool assemblies, one or more geared synchronicity sleeves, one or more synchronicity sleeve shafts, one or more shifting components including a shift fork bar and shift stick, and a plurality of output gears on an output shaft, and wherein the output spool is located on the output shaft.

16. The device of claim 4 wherein the carriage moves on linear bearings attached by a pattern of linear bearing retaining bolts that enable the carriage linear bearings to be replaced when worn; said linear bearing retaining bolts attach to the launch arms and cushion the motion of the carriage.

17. The device of claim 15 wherein the shift stick is split into two halves exposing a locking trigger which releases a locking mechanism retaining the shift stick in position during operation; and wherein the locking trigger further comprises a trigger spring that provides positive pressure upon the locking trigger to maintain it in position.

18. The device of claim 15 wherein the synchronicity sleeve shaft is rotatable, and the geared synchronicity sleeve of the power variance system alternatively connects and disconnects output gears as it moves along the synchronicity sleeve shaft.

19. A method of use for the device of claim 1, comprising the following steps:
1. Deliver the packed and folded device to the launch site with modular rail sections folded, the cable wound onto the retraction winch, and the support components removed;
2. Unfold the modular rail sections and latch them into place using the latch system;
3. Attach the one or more launch rails and the one or more support legs to the support truss;
4. Slide the carriage onto the launch rail;
5. Unwind the cable from the retraction winch and connect a first end of the cable to the carriage using a cable quick lock;
6. Unwind a second end of the cable from the output spool and position it over the bottom alignment pully and top alignment pully before threading it through the stop spring system and attaching it to the carriage;
7. press a locking trigger to unlock a shift stick and move the stick into the position that connects the designed number of constant torque springs to an output spool;
8. Once the shift stick is locked in place, engage a retraction winch to winch the carriage back to the back end of the rail where it remains in the tensioned position;
9. Place a UAV in the wing clamps located on the launch arms of a carriage;
10. Release the cable quick lock between the carriage and the cable wound around the retraction winch so that the carriage is pulled by the cable along the rail as an output spool rotates at a constant torque causing the carriage to accelerate;
11. The carriage hits a buffer spring of the stop spring system which causes the UAV to be launched from the carriage;
12. The carriage slows before hitting a buffer pad of the stop spring system, which slows the carriage to a stop at the front end of the rail;
13. The component parts are removed from the modular rail sections, which are then disconnected, folded and repacked.

20. A system for launching UAV's using constant torque, the system comprising the device of claim 1 and the method of using the device of claim 19.

* * * * *